(12) United States Patent
King et al.

(10) Patent No.: US 8,972,729 B2
(45) Date of Patent: *Mar. 3, 2015

(54) SECURE INFORMATION DELIVERY

(71) Applicant: Verizon Patent and Licensing Inc., Basking Ridge, NJ (US)

(72) Inventors: William C. King, Lafayette, CA (US); Kwai Yeung Lee, Pittsburg, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 206 days.

This patent is subject to a terminal disclaimer.

(21) Appl. No.: 13/658,909

(22) Filed: Oct. 24, 2012

(65) Prior Publication Data

US 2014/0115333 A1    Apr. 24, 2014

(51) Int. Cl.
*H04L 29/06* (2006.01)

(52) U.S. Cl.
USPC ............................. 713/168; 713/150; 726/12

(58) Field of Classification Search
USPC ......................................................... 713/168
See application file for complete search history.

(56) References Cited

U.S. PATENT DOCUMENTS

| | | | |
|---|---|---|---|
| 6,678,731 B1* | 1/2004 | Howard et al. | 709/225 |
| 2003/0068047 A1* | 4/2003 | Lee et al. | 380/278 |
| 2004/0172307 A1* | 9/2004 | Gruber | 705/3 |
| 2005/0039054 A1* | 2/2005 | Satoh et al. | 713/201 |
| 2005/0210253 A1* | 9/2005 | Shigeeda | 713/171 |
| 2005/0273843 A1* | 12/2005 | Shigeeda | 726/5 |
| 2006/0048214 A1* | 3/2006 | Pennington et al. | 726/5 |
| 2008/0222707 A1* | 9/2008 | Pathuri et al. | 726/4 |
| 2011/0239283 A1* | 9/2011 | Chern | 726/6 |
| 2012/0011244 A1* | 1/2012 | Zhu | 709/224 |

* cited by examiner

*Primary Examiner* — Yogesh Paliwal

(57) ABSTRACT

A first network device is configured to receive a request for content from a user device, determine that the user device is not authenticated, and send information to the user device that the user device requires authentication. The first network device is configured further to receive a notification that the user device is authorized to receive content from multiple content providers. The first network device is configured further to generate a secret key and authenticate the user device by using the secret key. The first network device is further configured to send the content to the user device.

20 Claims, 7 Drawing Sheets

SECURE INFORMATION DELIVERY

BACKGROUND

The generic bootstrapping architecture (hereinafter referred to as "GBA") authentication procedure permits the authentication of user devices (e.g., wireless devices) within a Third Generation Partnership Project (3GPP) cellular network environment. The authentication may include the creation of secret keys that are used to authenticate a user device with other network devices within the cellular network environment.

DETAILED DESCRIPTION OF PREFERRED EMBODIMENTS

The following detailed description refers to the accompanying drawings. The same reference numbers in different drawings may identify the same or similar elements.

Systems and/or methods described herein may generate one or more secret keys that can be used by a user device to receive information from multiple sources. For example, a network device may be used to authenticate a user device so that the user device (using a secret key) can receive information from a particular source. The user device may also receive information from another source based on the same authentication process.

While the following description focuses on the 3GPP Long Term Evolution (LTE) standard, it will be appreciated that systems and/or methods, described herein, are equally applicable to other wireless standards, such as a wireless fidelity ("WiFi") standard, worldwide interoperability for microwave access ("WiMAX"), global system for mobile communications ("GSM"), or any other wireless standard.

Figure 1A:
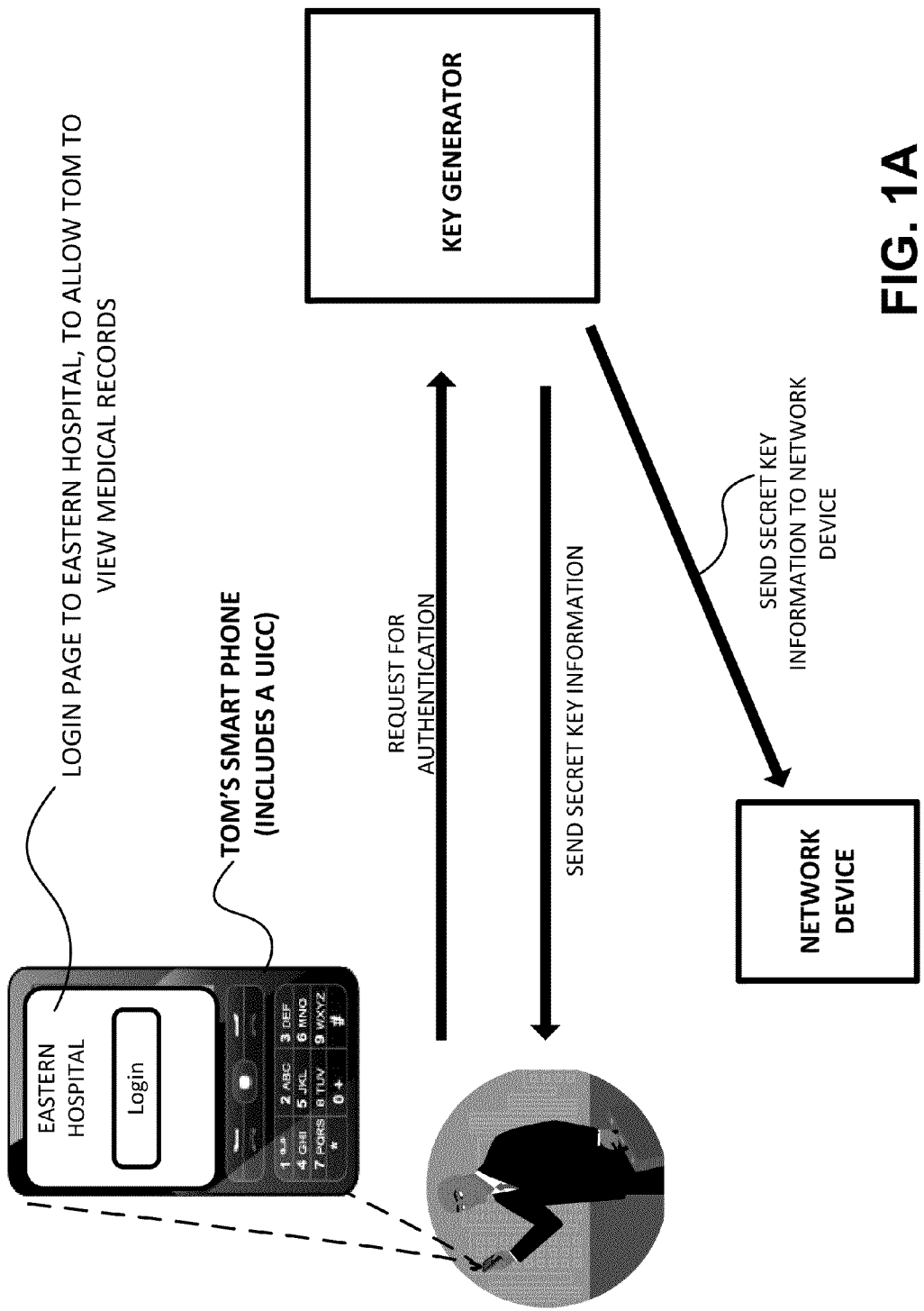
FIGS. 1A-1B are diagrams of an overview of an implementation described herein.
Figure 1B:
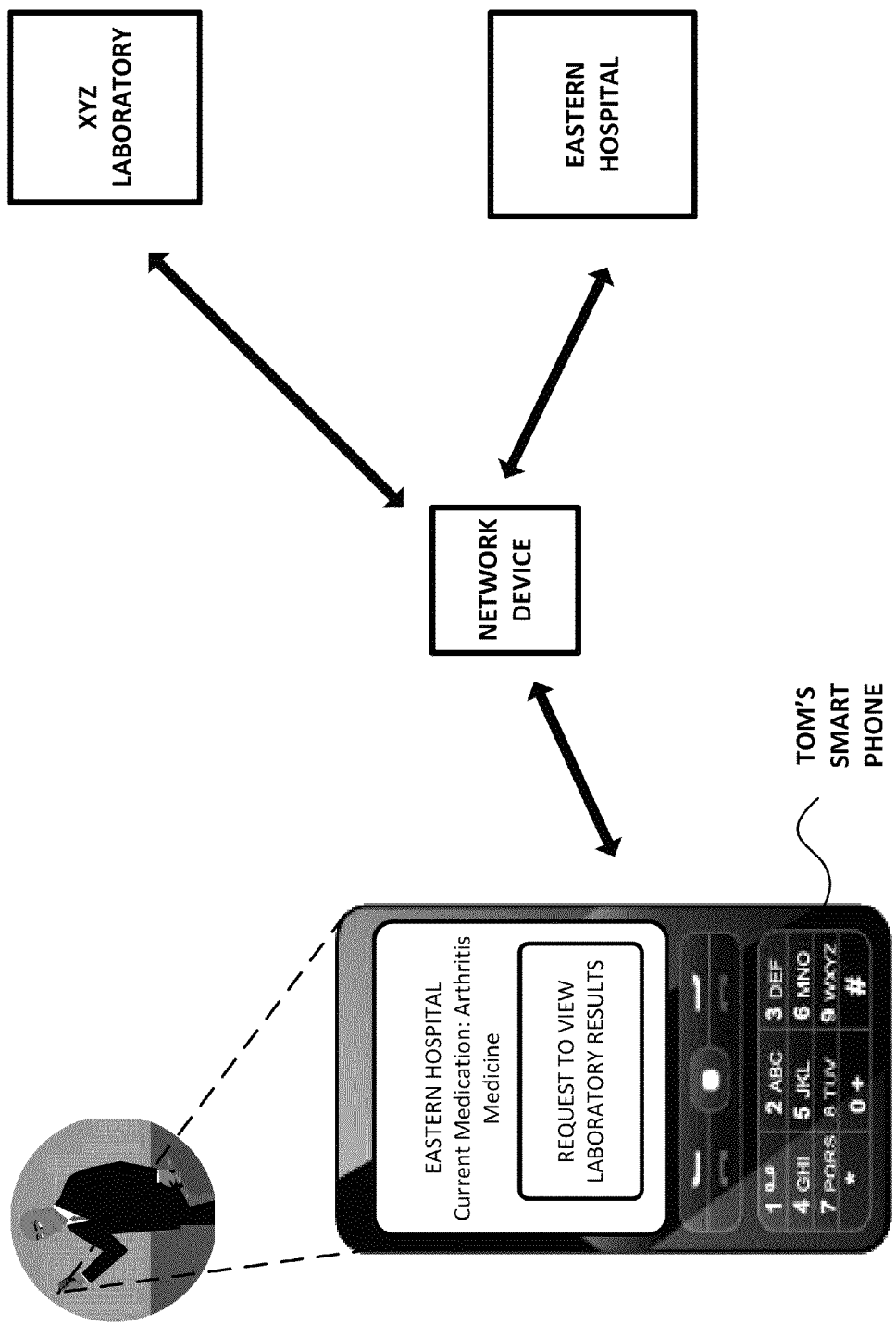

FIGS. 1A-1B are diagrams of an overview of an implementation described herein. FIG. 1A shows Tim's smart phone, a network device, and a key generator. FIG. 1B shows Tim's smart phone, a network device, Eastern Hospital, and XYZ Laboratory.

As shown in FIG. 1A, Tom is using his smart phone and would like to log into a service associated with Eastern Hospital to receive his medical information. Tom is receiving medical care from Eastern Hospital.

For a patient to receive content (being protected with a secret key) from Eastern Hospital, the patient (such as Tom) and the patient's user device (Tom's smart phone) may be validated by the network that Tom uses for receiving services to his smart phone. Assume, that once Tom enters his login information, the network may validate that Tom's user account (associated with Eastern Hospital) is authorized to receive information from Eastern Hospital. Further, assume that based on information stored in the network that Tom is also authorized to receive information from XYZ Laboratory which is a separate organization than Eastern Hospital. Assume that XYZ Laboratory provides medical laboratory results for patients of Eastern Hospital. Further, assume that the network may validate that Tom's smart phone is authorized to use the network.

Once Tom's user account and Tom's smart phone are authorized to receive information from Eastern Hospital, the key generator may generate a cipher key, an integrity key, and/or other information. Tom's smart phone may include a universal integrated circuit card (hereinafter referred to as "UICC") that may receive the cipher key, integrity key, and/or the other information from the key generator. The UICC may use the information received from the key generator to generate a secret key. The UICC may send the secret key to Tom's smart phone. Tom's smart phone may use the secret key to decrypt securely transmitted information from the network device. The key generator may also send the cipher key, the integrity key, and/or the other information to the network device. The network device may generate the same secret key using the information received from the key generator. The network device and Tom's smart phone may authenticate each other by using the secret key. The network device may use the secret key to encrypt information from Eastern Hospital and send the encrypted information to Tom's smart phone. Tom's smart phone may use the secret key to decrypt the information.

As shown in FIG. 1B, Tom is accessing his medical information on his smart phone. Assume that Tom's smart phone and the network device have received the secret key, described with regard to FIG. 1A. Further, assume that Eastern Hospital has also received the same secret key using the process described above. As Tom is accessing his medical information, from Eastern Hospital, an option is provided to Tom to allow Tom to access laboratory results from XYZ Laboratory. Tom decides that he would like to view the laboratory results. Tom selects the icon button on the screen and a request for the laboratory results is sent to the network device. The network device determines that Tom's smart phone is authorized to receive information from XYZ Laboratory based on the network's authorization. The network device sends the request for information to XYZ Laboratory. XYZ Laboratory receives the request and sends the laboratory results to the network device. The network device encrypts the laboratory results and sends the laboratory results to Tom's smart phone. Tom's smart phone, using the secret key, decrypts the laboratory results to permit Tom to view the laboratory results on his smart phone. While FIG. 1B shows information from XYZ Laboratory and Eastern Hospital being sent to Tom's smart phone, via the network device, information may be sent from XYZ Laboratory and Eastern Hospital to Tom's smart phone without going through the network device.

As a result, multiple information providers may send encrypted information to a user device by using the same authentication process performed by the network. This may permit a user device to receive different information from different information providers without the need to generate a secret key to receive information from the different information providers. This may reduce the amount of network resources required to securely send information to a user device.

Figure 2:
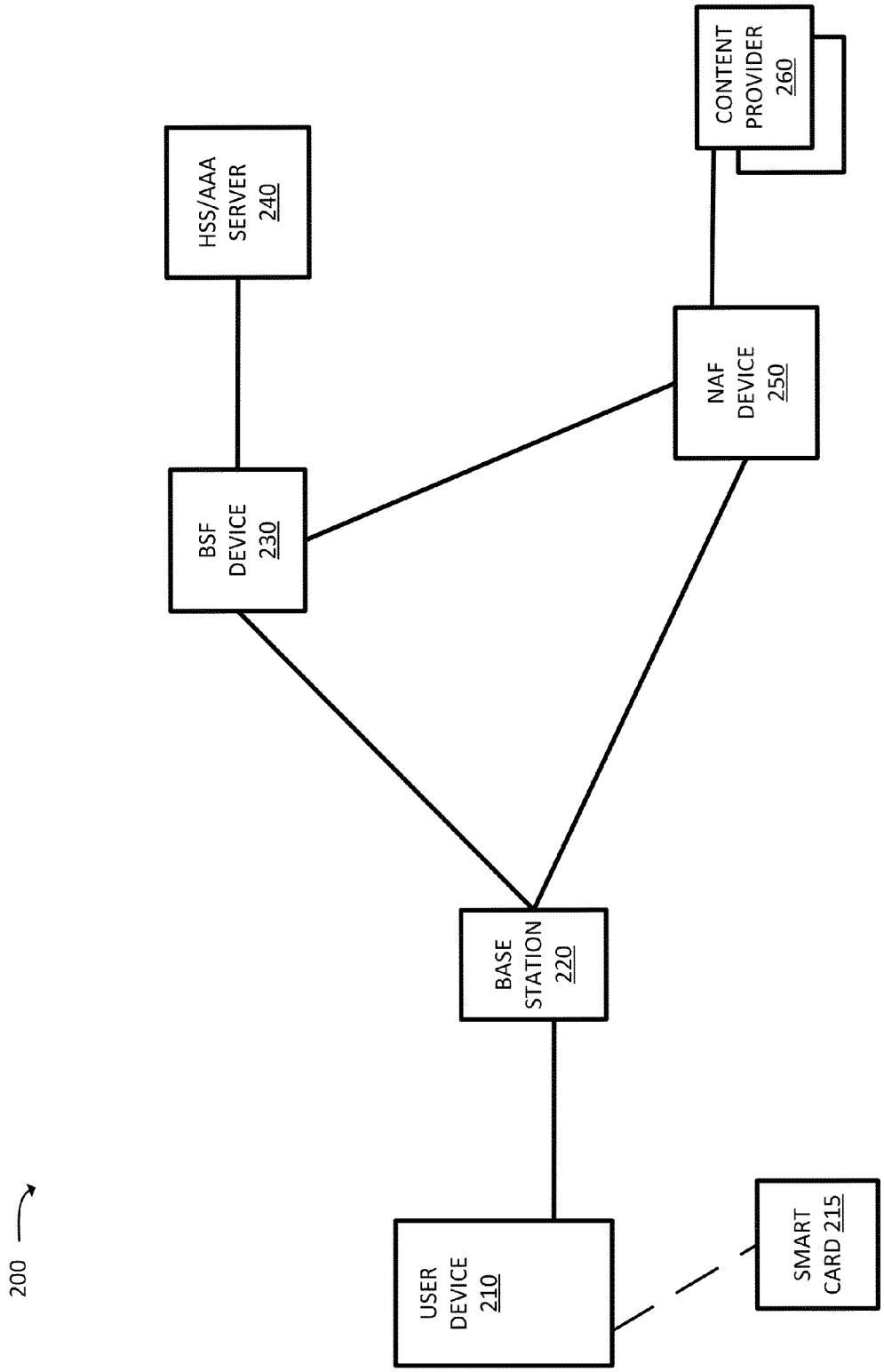
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a user device 210, a smart card 215, a base station 220, a bootstrapping server function device 230 (hereinafter referred to as "BSF device 230"), a home subscriber server (HSS)/authentication, authorization, accounting (AAA) server 240 (hereinafter referred to as "HSS/AAA server 240"), a network application function service device 250 (hereinafter referred to as "NAF device 250"), and a content provider 260.

Devices of environment 200 may interconnect via wired connections, wireless connections, or a combination of wired and wireless connections by using one or more of the following types of networks: a cellular network, a public land mobile network (PLMN), a second generation (2G) network, a third generation (3G) network, a fourth generation (4G) network, a fifth generation (5G) network, a local area network (LAN), a wide area network (WAN), a metropolitan network (MAN), a LTE network, a telephone network (e.g., the Public Switched Telephone Network (PSTN)), an ad hoc network, a managed IP network, a virtual private network (VPN), an intranet, the Internet, a fiber optic-based network, and/or combination of these or other types of networks.

User device 210 may include any mobile device, such as a wireless mobile communication device that is capable of communicating with a network (e.g., LTE network). For example, user device 210 may include a radiotelephone, a personal communications system (PCS) terminal (e.g., that may combine a cellular radiotelephone with data processing and data communications capabilities), a personal digital assistant (PDA) (e.g., that can include a radiotelephone, a pager, Internet/intranet access, etc.), a smart phone, a computer, a laptop, a tablet computer, a camera, a personal gaming system, a television, or another mobile, or communication device.

User device 210 may include a variety of applications, such as, for example, an e-mail application, a voice over Internet Protocol (VoIP) application, a telephone application, a camera application, a video application, a multi-media application, a music player application, a visual voicemail application, a contacts application, a data organizer application, a calendar application, an instant messaging application, a texting application, a web browsing application, a location-based application (e.g., a GPS-based application), a blogging application, and/or other types of applications (e.g., a word processing application, a spreadsheet application, etc.).

Smart card 215 may correspond to a UICC or another type of smart card. Smart card 215 may include an integrated circuit and may facilitate the connection of user device 210 to a network, such as a LTE network. Smart card 215 may include one or more subscriber identity modules (SIMs). Smart card 215 may request data from network devices and perform calculations, based on the requested data, to authenticate user device 210. Smart card 215 may receive information relating to secret keys used in the process of decrypting incoming content from NAF device 250.

Base station 220 may include one or more network devices that receive, process, and/or transmit traffic, such as audio, video, text, and/or other data, destined for and/or received from user device 210. In an example implementation, base station 220 may be an eNB device and may be part of the LTE network. Base station 220 may receive traffic from and/or send traffic to BSF device 230 and NAF device 250. Base station 220 may send traffic to and/or receive traffic from user device 210 via an air interface. One or more of base stations 220 may be associated with a radio area network (RAN), such as a LTE network.

BSF device 230 may include one or more network devices that may provide application independent functions for mutual authentication of mobile devices (e.g., user device 210) and application devices (e.g., NAF device 250) to each other and for bootstrapping the exchange of secret session keys afterwards. The bootstrap procedure may be initiated, for example, during initial power-up of user device 210 or in response to a message from a device (e.g., NAF device 250) instructing user device 210 to begin a bootstrap procedure. In some implementations, BSF device 230 and NAF device 250 may be implemented within the same device. In some other implementations, BSF device 230 and NAF device 250 may be separate devices.

HSS/AAA server 240 may include one or more network devices that may manage, authenticate, update, and/or store, in a memory associated with HSS/AAA server 240, profile information associated with user device 210 that identifies applications and/or services that are permitted for and/or accessible by user device 210, bandwidth or data rate thresholds associated with the applications or services, information associated with a user of user device 210 (e.g., a username, a password, a personal identification number (PIN), etc.), rate information, minutes allowed, and/or other information. HSS/AAA server 240 may store information associated with a smart card (e.g., smart card 215). In some implementations, HSS/AAA server 240 may interact with BSF device 230. Additionally, or alternatively, HSS/AAA server 240 may include a device that performs authentication, authorization, and/or accounting (AAA) operations associated with a communication session with user device 210.

NAF device 250 may include one or more network devices that may permit user device 210 to access content (from content provider 260), based on authentication information received from HSS/AAA server 240 and/or BSF device 230. NAF device 250 may interact with BSF device 230 to initiate authentication functions of user device 210. Additionally, or alternatively, NAF device 250 may interact with user device 210 to receive authentication information. NAF device 250 may provide service announcements to user device 210 that include information (e.g., multicast service identifier, time of transmission, description of content, etc.) that may allow user device 210 to receive content and/or services from content provider 260.

Content provider 260 may include one or more servers, or other types of computation or communication devices that gather, process, and/or provide information in a manner described herein. For example content provider 260 may send, via NAF device 250, information to user device 210. In some implementations, content provider 260 and NAF device 250 may be separate devices. In some other implementations, content provider 260 and NAF device 250 may be implemented within the same device.

The term content is intended to be broadly interpreted to include any computer readable data that may be transferred over a network. Content may include objects, data, images, audio, video, text, files, and/or links to files accessible via one or more networks. Content may include a media stream, which may refer to a stream of content that includes video content (e.g., a video stream), audio content (e.g., an audio stream), and/or textual content (e.g., a textual stream).

The quantity of devices and/or networks, illustrated in FIG. 2 is provided for explanatory purposes only. In practice, there may be additional devices and/or networks; fewer devices and/or networks; different devices and/or networks; or differently arranged devices and/or networks than illustrated in FIG. 2. Also, in some implementations, one or more of the devices of environment 200 may perform one or more functions described as being performed by another one or more of the devices of environment 200.

Figure 3:
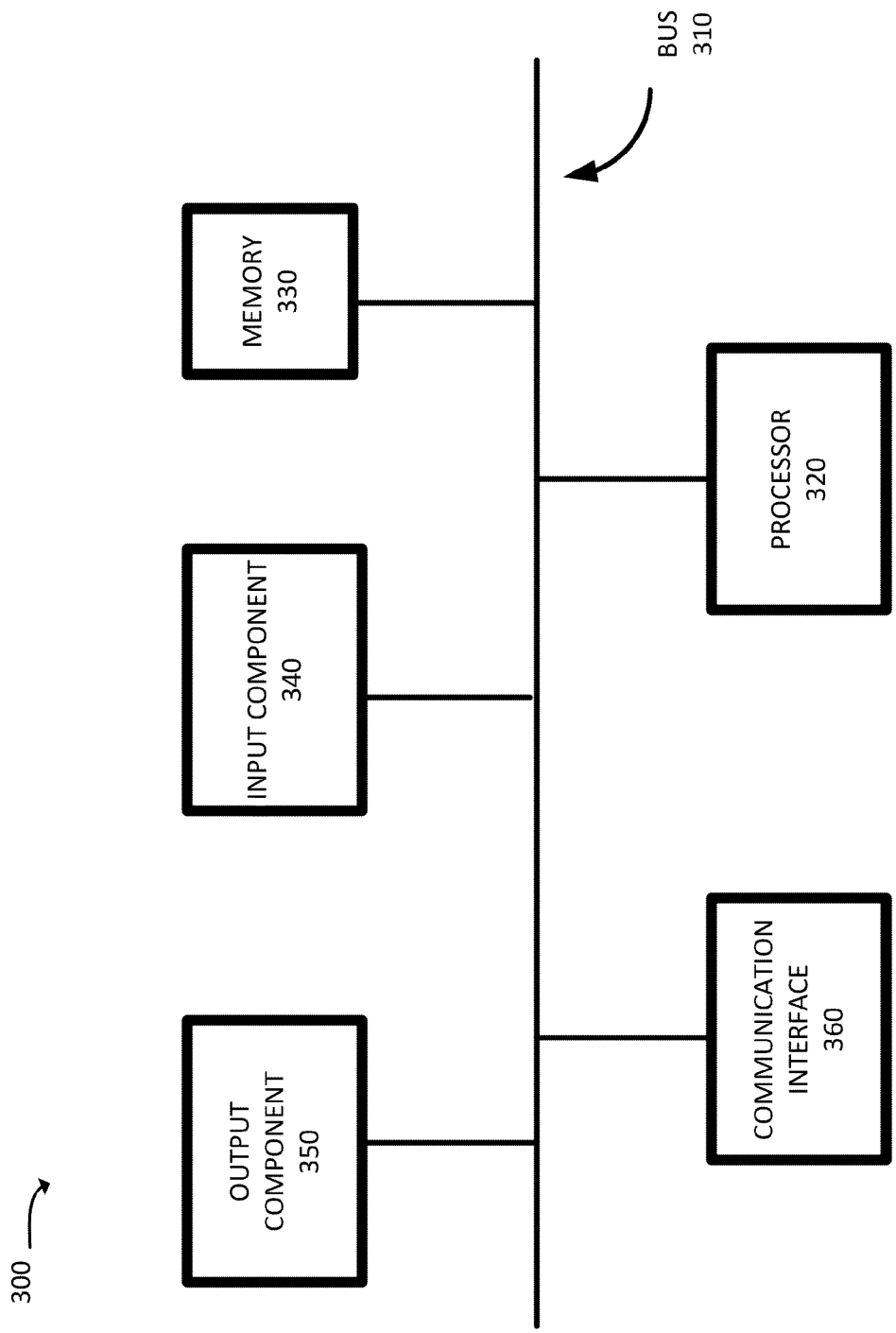
FIG. 3 is a diagram of example components of one or more devices of FIGS. 1 and 2.

FIG. 3 is a diagram of example components of a device 300. Device 300 may correspond to user device 210, smart card 215, base station 220, BSF device 230, HSS/AAA server 240, NAF device 250, and/or content provider 260. Additionally, or alternatively, each of user device 210, smart card 215, base station 220, BSF device 230, HSS/AAA server 240, NAF device 250, and/or content provider 260 may include one or more devices 300 and/or one or more components of device 300.

As shown in FIG. 3, device 300 may include a bus 310, a processor 320, a memory 330, an input component 340, an output component 350, and a communication interface 360.

Bus 310 may include a path that permits communication among the components of device 300. Processor 320 may include one or more processors, microprocessors, or processing logic (e.g., a field programmable gate array (FPGA), or an application specific integrated circuit (ASIC)) that interpret and execute instructions. Memory 330 may include any type of dynamic storage device that stores information and instructions, for execution by processor 320, and/or any type of non-volatile storage device that stores information for use by processor 320.

Input component 340 may include a component that permits a user to input information to device 300, such as a keyboard, a keypad, a button, a switch, etc. Output component 350 may include a component that outputs information to the user, such as a display, a speaker, one or more light emitting diodes (LEDs), etc.

Communication interface 360 may include any transceiver-like mechanism that enables device 300 to communicate with other devices and/or systems. For example, communication interface 360 may include an Ethernet interface, an optical interface, a coaxial interface, a wireless interface, or the like.

In another implementation, communication interface 360 may include, for example, a transmitter that may convert baseband signals from processor 320 to radio frequency (RF) signals and/or a receiver that may convert RF signals to baseband signals. Alternatively, communication interface 360 may include a transceiver to perform functions of both a transmitter and a receiver of wireless communications (e.g., radio frequency, infrared, visual optics, etc.), wired communications (e.g., conductive wire, twisted pair cable, coaxial cable, transmission line, fiber optic cable, waveguide, etc.), or a combination of wireless and wired communications. Communication interface 360 may connect to an antenna assembly (not shown in FIG. 3) for transmission and/or reception of the RF signals.

The antenna assembly may include one or more antennas to transmit and/or receive RF signals over the air. The antenna assembly may, for example, receive RF signals from communication interface 360 and transmit the RF signals over the air, and receive RF signals over the air and provide the RF signals to communication interface 360. In one implementation, for example, communication interface 360 may communicate with a network (described with regard to FIG. 2) and/or devices connected to a network (described with regard to FIG. 2).

As will be described in detail below, device 300 may perform certain operations. Device 300 may perform these operations in response to processor 320 executing software instructions (e.g., computer program(s)) contained in a computer-readable medium, such as memory 330, a secondary storage device (e.g., hard disk, CD-ROM, etc.), or other forms of RAM or ROM. A computer-readable medium may be defined as a non-transitory memory device. A memory device may include space within a single physical storage device or spread across multiple physical storage devices. The software instructions may be read into memory 330 from another computer-readable medium or from another device. The software instructions contained in memory 330 may cause processor 320 to perform processes described herein. Alternatively, hardwired circuitry may be used in place of or in combination with software instructions to implement processes described herein. Thus, implementations described herein are not limited to any specific combination of hardware circuitry and software.

While FIG. 3 shows device 300 as having a particular quantity and arrangement of components, in other implementations, device 300 may contain fewer components, additional components, different components, or differently arranged components than depicted in FIG. 3. Additionally, or alternatively, one or more components of device 300 may perform one or more tasks described as being performed by one or more other components of device 300.

Figure 4:
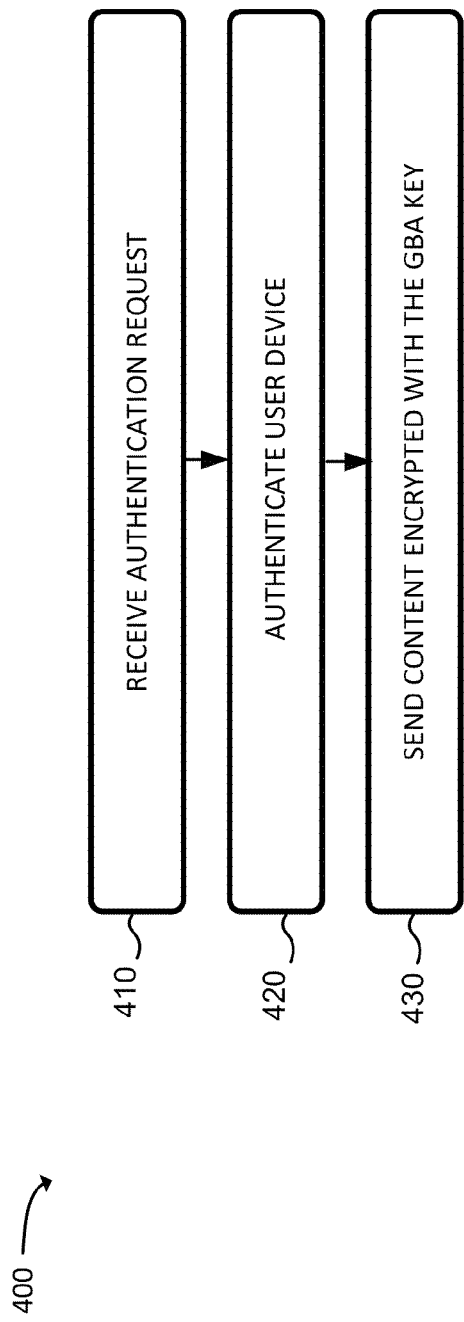
FIG. 4 is a flow chart of an example process for generating and using a secret key.

FIG. 4 is a flow chart of an example process for generating and using a secret key. In one example implementation, process 400 may be performed by NAF device 250. In another example implementation, one or more blocks of process 400 may be performed by one or more other devices, such as BSF device 230 or user device 210.

Process 400 may include receiving an authentication request (block 410). NAF device 250 may receive an authentication request from user device 210. User device 210 may be requesting authentication of user device 210 so that user device 210 may receive content from content provider 260 via NAF device 250. User device 210 may have an application, downloaded on user device 210, that is associated with receiving content from content provider 260. For example, user device 210 may have an application that can receive information from a hospital such as X-ray images. User device 210 may be requesting authentication of user device 210 based on a user of user device 210 initiating a request for content from content provider 260. Alternatively, user device 210 may be requesting authentication based on content provider 260 sending a message to user device 210 that includes a request to send content to user device 210 from content provider 260.

In one example implementation, before the authentication of user device 210 may occur, a user account, associated with content provider 260, may be validated by HSS/AAA server 240 and/or another network device. The user account may be validated by the user providing a user name and/or password associated with the user account. HSS/AAA server 240 and/or another network device may validate the user name and/or password (based on comparing the user name and/or password information received from user device 210 with the valid user name and/or password stored by HSS/AAA server 240 and/or the other network device) and send a notification to NAF device 250 that the user account is valid. For example, the user account may be associated with an application downloaded on user device 210 that permits the user to receive content from content provider 260.

In another example implementation, the authentication of user device 210 may occur without a user account being validated (e.g., no password required). For example, a hospital may only require that the authentication of user device 210 by the network is needed to receive information from content provider 260. Whether a user account needs to be validated may be set by an operator of content provider 260.

NAF device 250 may send a notification to user device 210 that user device 210 is to be authenticated before content may be sent to user device 210. User device 210 may receive the notification from NAF device 250. User device 210 may send the authentication request to BSF device 230 so that user device 210 may be validated to receive content from content provider 260.

BSF device 230 may use the GBA authentication procedure to authenticate user device 210. In the GBA authentication procedure, BSF 230 may send a message to HSS/AAA server 240. The message may include a request to determine whether user device 210 is permitted to use a LTE network and/or whether user device 210 is permitted to access content from content provider 260.

HSS/AAA server 240 may receive the message. HSS/AAA server 240 may determine that user device 210 is an authorized user device to receive content from content provider 260. Content provider 260 may provide HSS/AAA server 240 with information that identifies what user device 210 is authorized to receive from content provider 260. In some implementations, the information that user device 210 may receive is determined prior to HSS/AAA server 240 receiving the request to determine that user device 210 is an authorized user. For example, content provider 260 may be a hospital that may permit user device 210 to receive content about recent outpatient procedures that the patient received at the hospital. The hospital may send information (via other network devices) to HSS/AAA server 230 that user device 210 is authorized to receive selected information from the hospital.

Content provider 260 may, for example, provide HSS/AAA server 240 with information that indicates that user device 210 may receive content from different providers 260. For example, the hospital may permit user device 210 to receive content from a pharmacy that provides medication associated with the care of the user and/or permit user device 210 to receive information from a specialist (e.g., an urologist).

HSS/AAA server 240 may authenticate user device 210 by determining that user device 210 is authorized to use the LTE network (e.g., based on validating an identifier, such as a mobile device number (MDN), associated with user device 210) and may also authorize user device 210 to receive content based on instructions received from content provider 260. The instructions from content provider 260 may permit user device 210 to be authorized to receive content from other content providers 260. For example, a hospital (content provider 260) may provide instructions to HSS/AAA server 260 that user device 210 is permitted to receive content from the hospital and content from a rehabilitation clinic (the other content provider 260) based on an agreement between the hospital and the rehabilitation clinic.

HSS/AAA server 240 may send a message to BSF device 230 that user device 210 is authenticated. If HSS/AAA server 240 does not authenticate user device 210 (e.g., user device 210 is not authorized to receive content from content provider 260), then HSS/AAA server 240 may send a message to BSF device 230 that user device 210 is not authorized. In this case, BSF device 230 may send a message to user device 210 that user device 210 is not authorized to receive the content from content provider 260.

When HSS/AAA server 240 authenticates that user device 210 is permitted to use the LTE network and authorized to receive content from content provider 260, BSF device 230 may send a message to user device 210 that user device 210 is authenticated. User device 210 may receive the message.

With user device 210 authenticated, BSF device 230 may create a BSF transaction identifier ("hereinafter referred to as "B-TID"). The B-TID is an identifier used to define the session during which user device 210 is validated by the network. BSF device 230 may store the B-TID and may send the B-TID to user device 210. B-TID may be valid for a limited amount of time. For example, the B-TID may be valid for a particular interval of time (e.g., 1 hour, 12 hours, 24 hours, etc.). Alternatively, the B-TID may be valid as long as a session is valid, or the B-TID may be valid for a time period greater than the time associated with a session. Additionally, or alternatively, the B-TID may be valid for a particular coverage area (e.g., valid as along as user device 210 is located in a particular coverage area).

Additionally, BSF device 230 may generate a cipher key (hereinafter referred to as "Ck") and an integrity key (hereinafter referred to as "Ik"). The Ck is associated with protecting and providing signal data integrity between devices. The Ik is associated with providing authentication of a device (e.g., user device 210 or NAF device 250). The Ck and the Ik may be stored by BSF device 230 and sent to smart card 215 in user device 210. Smart card 215 may use a key derivation function to generate a GBA key by using the Ck and the Ik.

In some implementations, the Ck and the Ik are associated with a session (e.g., a LTE session). Once the session expires, the Ck and the Ik are no longer valid. The session may expire based on a user turning off user device 210, user device 210 being powered down, user device 210 moving to a different coverage area, or user device 210 attempting to use different network technology.

Additionally, or alternatively, user device 210 may use other factors to generate the GBA key, such as the B-TID, an international mobile subscriber identifier (hereinafter referred to as "IMSI"), GUSS (GBA user security settings), a mobile subscriber integrated services digital network (hereinafter referred to as "MSISDN"), an integrated circuit card identifier (hereinafter referred to as "ICCID"), an application identifier (e.g., an identifier identifying the type of application that requires the GBA key, such as an application providing health-related content to user device 210), an enterprise name (e.g., such as a specific entity ("Shady Pines Nursing Home"), that uses the GBA key for authentication of user devices 210 requesting information and/or content), multiple enterprise names (e.g., such as a "Northern General Hospital" and a "Bob's Pharmacy") that use the GBA key for authentication of user devices 210 requesting information), a NAF identifier, and/or a service identifier.

The service identifier may identify the type of content that the GBA key may be used to securely transmit to user device 210. For example, the service identifier may be associated with one or more different types of content that user device 210 is authorized to receive, such as X-rays, sonograms, lab results, doctor's diagnosis, prescription information, insurance payment information, and/or any other type of content that may be protected by the GBA key.

For example, user device 210 may be authorized (by content provider 260) to receive X-ray and laboratory result information (e.g., from a hospital). Thus, the GBA key may permit NAF device 250 to permit user device 210 to receive the X-ray and laboratory results from content provider 260. User device 210 may, for example, also be authenticated to receive prescription information and doctor's reports from another content provider 260 (e.g., a private medical clinic).

Process 400 may include authenticating the user device (block 420). NAF device 250 may receive the Ck and the Ik, B-TID, service identifier information, and/or other information described with regard to block 410. NAF device 250 may use the information received from BSF device 230 to derive a GBA key (described with regard to block 410). User device 210 and NAF device 250 may authenticate each other by using each other's GBA key. Since both GBA keys are derived using the same information, the GBA keys may validate each other and allow NAF device 250 to authenticate user device 210.

The GBA key may expire after a period of time (e.g., the GBA key is valid for 1 hour, 12 hours, 24 hours, etc.), or in response to an occurrence of an event (e.g., a specific communication between user device 210 and content provider 260). Once the period of time expires, or the event occurs, NAF device 250 may determine that the GBA key is no longer valid. The GBA key, being used by user device 210, may also expire and user device 210 may request authentication (e.g., based on receiving a message from NAF device 250 that user device 210 is using an expired GBA key to request content) from BSF device 230 to receive a new GBA key.

NAF device 250 may use the GBA key to determine which content may be sent to user device 210 from content provider 260. For example, the GBA key may permit that only X-ray information may be sent from content provider 260 (e.g., a hospital), via NAF device 250, to a user device 210 being used by a physical therapy clinic.

Process 400 may include sending content encrypted with the GBA key (block 430). For example, a user, using user device 210, may request X-ray information, prescription information, and laboratory results from content provider 260 (e.g., a hospital). NAF device 250 may determine that user device 210 is authorized to receive the content from content provider 260 described with regard to block 420. NAF device 250 may send a message to content provider 260 requesting content be sent to user device 210 based on user device 210 being authorized (described with regard to block 410) to receive the content from content provider 260.

Content provider 260 may receive the request and may send the content to NAF device 250. NAF device 250 may receive the content and encrypt the content with the GBA key. NAF device 250 may send the content to user device 210. User device 210 may receive the content and may decrypt the content from content provider 260, using the GBA key stored by user device 210. The content may be sent to user device 210 via an application (associated with content provider 260) being used on user device 210.

Alternatively, NAF device 250 may determine, based on the authorization from HSS/AAA server 230, that user device 210 is not permitted to receive X-ray information, but user device 210 is permitted to receive the laboratory results and the prescription information. In one example implementation, NAF device 250 may send a message to user device 210 that user device 210 is not permitted to receive X-ray information and that user device 210 can resubmit the request. In another example implementation, NAF device 250 may send a message to user device 210 that user device 210 is not permitted to receive the X-ray information. NAF device 250 may send a message to content provider 260 requesting the laboratory results and prescription information.

Additionally, or alternatively, user device 210 may send a request to NAF device 250 to receive different content from another content provider 260. For example, user device 210 may request content associated with a pharmacy order, from another content provider 260. NAF device 250 may determine, based on information received from BSF device 230 (described with regard to blocks 410 and 420) and stored by NAF device 250, that user device 210 is permitted to receive the different content from the other content provider 260. NAF device 250 may send a request to the other content provider 260. The other content provider 260 may send the different content to NAF device 250. NAF device 250 may encrypt the different content with the same GBA key used to encrypt the content from content provider 260. If user device 210 is not permitted to receive the different content from the different content provider 260, NAF device 250 may send a message to user device 210 that user device 210 is not permitted to receive the different content from the different content provider 260.

Additionally, or alternatively, user device 210 may send a request to NAF device 250 to send the content from content provider 260 to another user device 210. For example, user device 210 may be authorized (as described in block 410) to receive content from a content provider 260, such as a hospital. The user, of user device 210, may decide that the user would like to send the content (from content provider 260) to the other user device 210. For example, the other user device 210 may be associated with a doctor's office, pharmacy, hospital, nursing home, rehabilitation clinic, medical specialist's office, therapist's office, and/or any other type of organization. The authorization, stored by HSS/AAA server 240, may include authorization for the other user device 210 to receive some, or all, of the content sent from content provider 260 to user device 210.

The other user device 210 may receive a message from user device 210. The message may include a link to receive content from content provider 260. The other user device 210 may receive the message and may send a request for the content from content provider 260 to NAF device 250.

NAF device 250 may determine that the other user device 210 requires authentication before the other user device 210 is authorized to receive the content from content provider 260. The other user device 210 may be authenticated in a similar manner to that described in block 410. The other user device 210 may use the same GBA key (generated in a manner similar to that described with regard to block 420) that was provided to user device 210. The other user device 210 may be authorized to receive the same content from content provider 260 that is sent to user device 210. In one example implementation, BSF device 230 may use previously received authorization information (based on authorizing user device 210) to send the same GBA key information (e.g., the Ck and the Ik, and/or other information) to the other user device 210. In another example implementation, BSF device 230 may receive authorization from HSS/AAA server 240 before the same GBA key information is provided to the other user device 210 (described with regard to block 410).

Additionally, or alternatively, the other user device 210 may communicate with user device 210 by using the same GBA key. The communication between the two user devices may occur through a network device (e.g, NAF device 250) or the two user devices may communicate with each other by using an Internet Protocol address (IP address), or another type of address assigned to each of the user devices.

Alternatively, the other user device 210 may use a different GBA key (generated in a manner similar to that described with regard to block 420) that authorizes the other user device 210 to receive the same content from content provider 260 that is being sent to user device 210 or the other user device 210 may receive different content from content provider 260. For example, an insurance company or a doctor (associated with other user device 210) may be authorized (via HSS/AAA server 240 and a GBA key) to receive only billing information and not other information, via NAF device 250, from a hospital (content provider 260). NAF device 250 and the other user device 210 may use the different GBA key to authenticate each other (in a manner similar to that described in block 410). The other user device 210 may use the different GBA key to receive content from content provider 260, via NAF device 250. This may permit the user of the other user device 210 to receive content from content provider 260 at the same time that the user of user device 210 is receiving content from content provider 260.

While a series of blocks has been described with regard to FIG. 4, the blocks and/or the order of the blocks may be modified in other implementations. Further, non-dependent blocks may be performed in parallel.

Figure 5A:
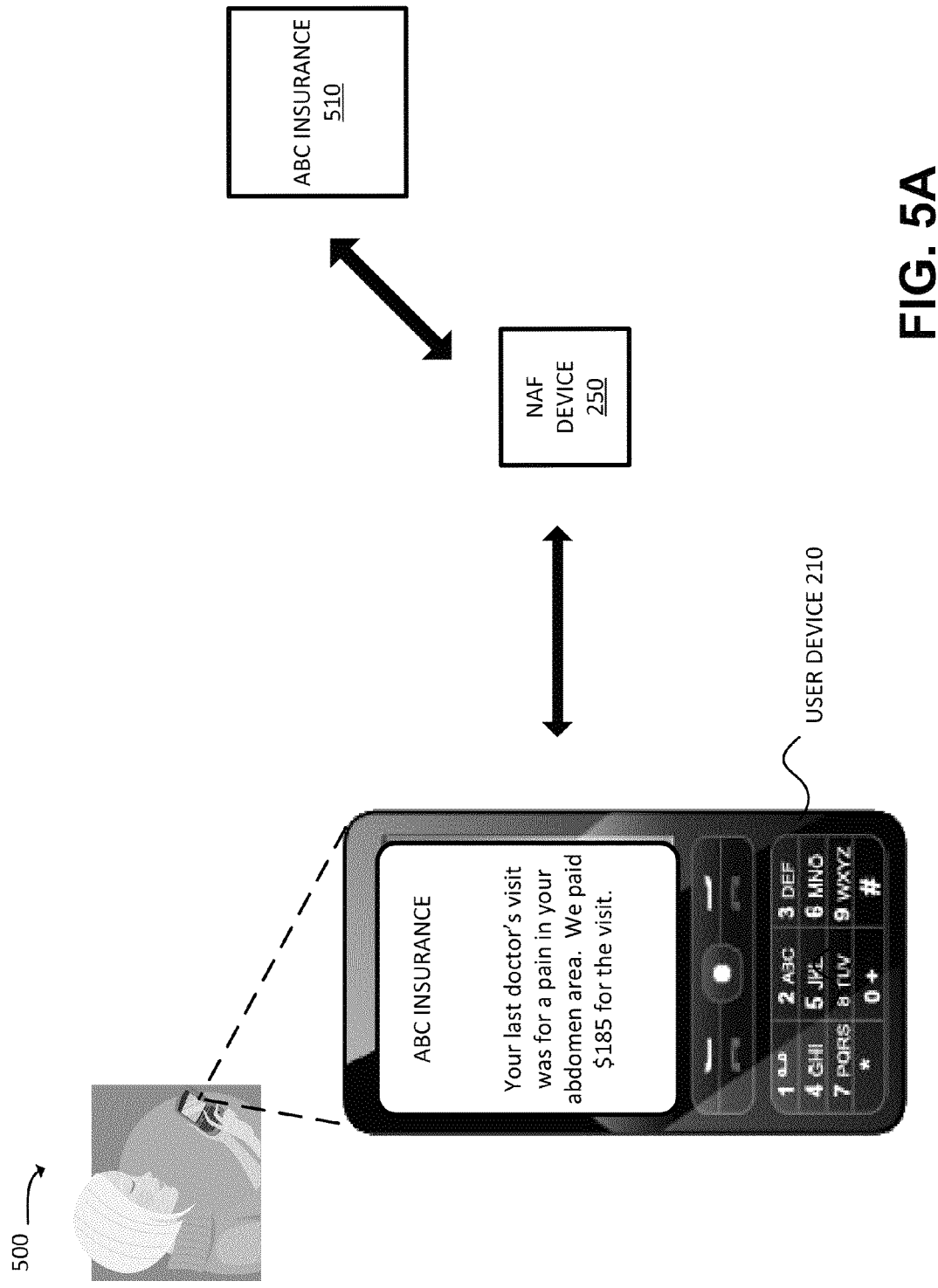
FIGS. 5A-5B are diagrams of example processes for authentication of a user and/or a user device.
Figure 5B:
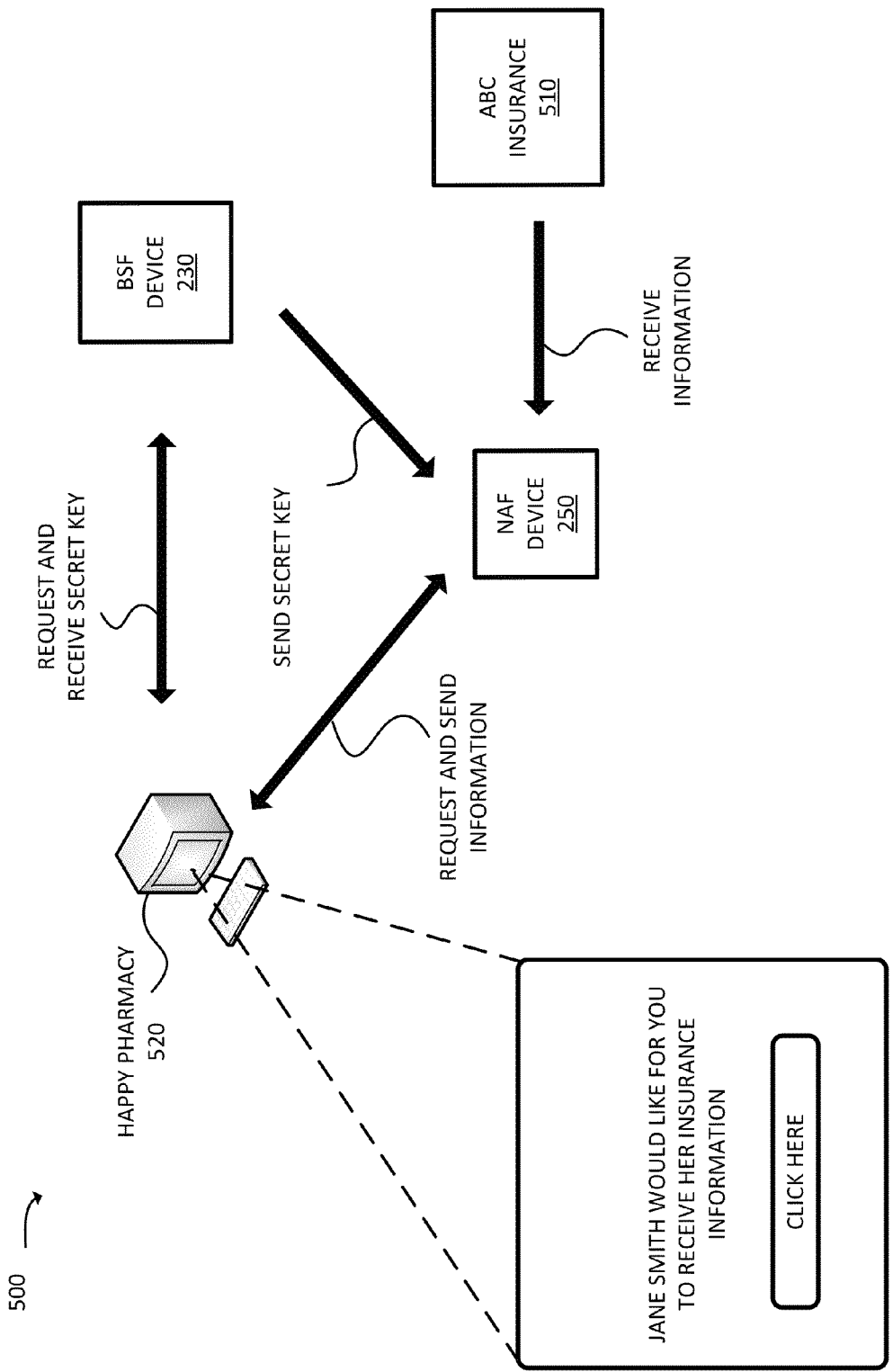

FIGS. 5A-5B are example processes for creating and using a secret key. FIG. 5A shows user device 210, NAF device 250, and ABC Insurance 510. FIG. 5B shows BSF device 230, NAF device 250, ABC Insurance 510, and Happy Pharmacy 520. ABC Insurance 510 may correspond to content provider 260, described with regard to FIG. 2. Happy Pharmacy 520 may correspond to user device 210, described with regard to FIG. 2.

As shown in FIG. 5A, a user (Jane) of user device 210 is receiving insurance information from ABC Insurance 510 via NAF device 250. Assume that prior to receiving the insurance information from ABC Insurance 510, user device 210 was authenticated by NAF device 250 and BSF device 230 (not shown in FIG. 5A). Assume that the user name and password for the user account associated with ABC Insurance 510 was authenticated by HSS/AAA server 240 and/or another network device. Further, assume that prior to receiving the insurance information from ABC Insurance 510, NAF device 510 received a secret key (e.g., a GBA key) to encrypt the insurance information from ABC Insurance 510 and user device 210 received the same secret key to decrypt the insurance information from NAF device 250.

As Jane is receiving the insurance information (on user device 210) from ABC Insurance, Jane remembers that her pharmacy was requesting updated health insurance information. As shown in FIG. 5B, Jane decides to send a message to her pharmacy, Happy Pharmacy 520. An employee at Happy Pharmacy 520 may view a message from Jane that Jane would like Happy Pharmacy to receive information from ABC Insurance 510. The employee at Happy Pharmacy 520 decides to select the "click here" prompt and a message is sent from Happy Pharmacy 520 to NAF device 250. NAF device 250 determines that Happy Pharmacy 520 requires authentication and a secret key before information from ABC Insurance 510 can be sent to Happy Pharmacy 520. Happy Pharmacy 520 receives the message from NAF device 250. Happy Pharmacy 520 sends a request to BSF device 230 to receive authentication. Assume that BSF device 230 sends a message to HSS/AAA server 240 to determine whether Happy Pharmacy 520 may receive information from ABC Insurance 510. Assume that HSS/AAA server 240 determines that Happy Pharmacy 520 may receive selected information about customers of ABC Insurance 510 and HSS/AAA server 240 may send a message to BSF device 230 that Happy Pharmacy 520 is authorized to receive selected information from ABC Insurance 510.

BSF device 230 may send a message to Happy Pharmacy 520 including the secret key. BSF device 230 may also send information and the secret key to NAF device 250. BSF device 230 may notify NAF device 250 that Happy Pharmacy 520 may receive selected information about Jane from ABC Insurance 510. Happy Pharmacy 520 and NAF device 250 may authenticate each other by using the secret key. Happy Pharmacy 520 may now receive Jane's information from ABC Insurance 510 via NAF device 250.

Systems and/or methods described herein may authenticate multiple user devices by using one or more secret keys. As a result, the generation of fewer secret key may reduce the amount of network resources required to send encrypted information to a user device.

The foregoing description of implementations provides illustration and description, but is not intended to be exhaustive or to limit the implementations to the precise form disclosed. Modifications and variations are possible in light of the above disclosure or may be acquired from practice of the implementations.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

No element, act, or instruction used in the present application should be construed as critical or essential unless explicitly described as such. Also, as used herein, the article "a" is intended to include one or more items and may be used interchangeably with "one or more." Where only one item is intended, the term "one" or similar language is used. Further, the phrase "based on" is intended to mean "based, at least in part, on" unless explicitly stated otherwise.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method comprising:
   receiving, by a first network device, a request for content from a user device;
   determining, by the first network device, that the user device is not authenticated based on receiving the request for content from the user device;
   sending, by the first network device and to the user device, information indicating that the user device requires authentication before the user device is authorized to receive the content from a content provider;
   receiving, by the first network device and from a second network device, a notification indicating that the user device is authenticated based on the second network device determining that the user device is authorized to receive the content from the content provider;
   generating, by the first network device, a secret key based on receiving the notification,
   the secret key enabling the user device to receive the content from the content provider;
   authenticating, by the first network device, the user device by using the secret key; and
   causing, by the first network device, the content to be sent from the content provider, and to the user device, based on authenticating the user device.

2. The method of claim 1, where receiving the notification from the second network device includes:

receiving information indicating that the user device is permitted to receive one particular type of content and that the user device is not permitted to receive another type of content.

3. The method of claim 1, where generating the secret key includes:
generating the secret key based on a generic bootstrapping user security setting, a cipher key, and a service identifier.

4. The method of claim 1, where generating the secret key includes:
generating the secret key based on an international mobile subscriber identity, associated with the user device, a generic bootstrapping user security setting, and an application identifier associated with an application associated with the content provider.

5. The method of claim 1, where authenticating the user device by using the secret key includes:
communicating with a universal integrated circuit card; and
authenticating the user device, based on communicating with the universal integrated circuit card, by using the secret key.

6. The method of claim 1, further comprising:
receiving a second request for the content from a second user device,
the second request being received based on the second user device receiving a message, from the user device, indicating that the user device is requesting the second user device to receive the content from the content provider;
sending, to the second user device, information indicating that the second user device requires authorization;
receiving, from the second network device, a notification indicating that the second user device is authorized to receive the content from the content provider; and
causing, based on receiving the notification indicating that the second user device is authorized to receive the content from the content provider, the content to be sent from the content provider and to the second user device.

7. The method of claim 6, where the content sent to the second user device is different than the content sent to the user device.

8. A system comprising:
a first network device including:
a memory; and
one or more processors to:
receive a request for content from a user device;
determine that the user device is not authenticated based on receiving the request for content from the user device;
send information to the user device,
the information indicating that the user device requires authentication before the user device is authorized to receive the content;
receive a notification from a second network device,
the notification indicating that the user device is authenticated based on the second network device determining that the user device is authorized to receive information from multiple content providers;
generate a secret key based on receiving the notification,
the secret key permitting the user device to receive the content from the multiple content providers;
authenticate the user device by using the secret key; and
cause the content to be provided to the user device based on authenticating the user device with the secret key.

9. The system of claim 8, where, when receiving the notification from the second network device that the user device is authenticated, the one or more processors are to:
receive information regarding a type of information that the user device is authorized to receive from the multiple content providers.

10. The system of claim 9, where, when receiving the notification from the second network device, the one or more processors are to:
receive information indicating that the user device is permitted to receive particular health-related information.

11. The system of claim 8, where, when receiving the notification from the second network device, the one or more processors are to:
receive information indicating that the user device is permitted to receive the content from a particular healthcare provider.

12. The system of claim 8, where the one or more processors are further to:
receive an update from the second network device,
the update including information identifying updated content that the user device is authorized to receive from a particular content provider of the multiple content providers;
generate a second secret key based on receiving the update; and
cause the updated content, using the second secret key, to be sent to the user device.

13. The system of claim 8, where the one or more processors are further to:
send additional information to the user device,
the additional information indicating that the user device is allowed to receive different content from a different content provider.

14. The system of claim 8, where the one or more processors are further to:
receive a second request for different content from a second user device,
the second request being received based on the second user device receiving a message from the user device,
the message indicating that the user device is requesting the second user device to receive different content from a particular content provider;
send, to the second user device, information indicating that the second user device requires authorization;
receive, from the second network device, a notification indicating that the second user device is not authorized to receive the different content from the particular content provider; and
send, to the second user device, a second notification indicating that the second user is not permitted to receive the different content.

15. The system of claim 8, where, when causing the content to be sent to the user device, the one or more processors are to:
send, to a content provider of the multiple content providers, a notification indicating that the user device information is validated;
receive the content from the content provider based on sending the notification; and
send the content to the user device based on receiving the content from the content provider.

16. A non-transitory computer-readable medium storing instructions, the instructions comprising:

one or more instructions that, when executed by one or more processors of a first network device, cause the one or more processors to:
  receive a request for content from a user device;
  determine that the user device is not authenticated based on receiving the request for content from the user device;
  send, to the user device, information indicating that the user device requires authentication before the user device is authorized to receive the content from one or more of a plurality of content providers;
  receive, from a second network device, a notification indicating that the user device is authenticated based on the second network device determining that the user device is authorized to receive the content from the one or more of the plurality of content providers;
  generate a secret key based on receiving the notification, the secret key permitting the user device to receive the content from the one or more of the plurality of content providers;
  authenticate the user device by using the secret key generated by the first network device; and
  cause the content to be sent to the user device based on authenticating the user device with the secret key, the content being sent to the user device by the one or more of the plurality of content providers.

17. The non-transitory computer-readable medium of claim 16, where the one or more instructions to determine that the user device is not authenticated include:
  one or more instructions that, when executed by the one or more processors, cause the one or more processors to:
    determine that the user device does not have a valid secret key to receive content from the one or more of the plurality of content providers.

18. The non-transitory computer-readable medium of claim 16, where the one or more instructions to receive the notification indicating that the user device is authorized to receive the content include:
  one or more instructions that, when executed by the one or more processors, cause the one or more processors to:
    receive information indicating that the user device is permitted to receive healthcare-related information from a health-care related provider associated with one of the plurality of content providers.

19. The non-transitory computer-readable medium of claim 16, where the one or more instructions to receive the notification indicating that the user device is authorized to receive the content include:
  one or more instructions that, when executed by the one or more processors, cause the one or more processors to:
    receive information indicating that the user device and a second user device are permitted to receive the content from the one or more of the plurality of content providers.

20. The non-transitory computer-readable medium of claim 16, where the one or more instructions to generate the secret key include:
  one or more instructions that, when executed by the one or more processors, cause the one or more processors to:
    generate the secret key using a service identifier, the service identifier including information regarding content that the user device is authorized to receive from the one or more of the plurality of content providers.

* * * * *